United States Patent

[11] 3,609,665

[72] Inventors Reinhard K. Kronies
Glendora;
Iver C. Hansen, Arcadia, both of Calif.

[21] Appl. No. 21,040
[22] Filed Mar. 19, 1970
[45] Patented Sept. 28, 1971
[73] Assignee Burroughs Corporation
Detroit, Mich.

[54] APPARATUS FOR EXCHANGING INFORMATION BETWEEN A HIGH-SPEED MEMORY AND A LOW-SPEED MEMORY
11 Claims, 3 Drawing Figs.

[52] U.S. Cl. .......... 340/172.5
[51] Int. Cl. .......... G11c 9/00, G06f 13/00
[50] Field of Search .......... 340/172.5

[56] References Cited
UNITED STATES PATENTS
3,525,080 8/1970 Couleur et al. .......... 340/172.5
3,521,240 7/1970 Bahrs et al. .......... 340/172.5

*Primary Examiner*—Gareth D. Shaw
*Attorney*—Christie, Parker & Hale

ABSTRACT: Data is exchanged between a high-speed memory and a plurality of low-speed memories at the speed of the high-speed memory by time-sharing a group of low-speed memories. During each Read-Write cycle of the high-speed memory, data is transferred from one of the low-speed memories to the high-speed memory during the Read operation of the high-speed memory cycle and transferred from the high-speed memory to the low-speed memory during the following Write operation of the high-speed memory. Both transfers take place between the Read operation and Write operation of the Read-Write cycle of the low-speed memory. By overlapping in time the Read-Write cycles of the low-speed memories, the exchange transfer takes place at a rate determined by the Read-Write cycle time of the high-speed memory.

INVENTORS.
REINHARD K. KRONIES
IVER C. HANSEN
BY
Christie, Parker & Hale
ATTORNEYS

PATENTED SEP 28 1971

3,609,665

SHEET 2 OF 3

APPARATUS FOR EXCHANGING INFORMATION BETWEEN A HIGH-SPEED MEMORY AND A LOW-SPEED MEMORY

FIELD OF THE INVENTION

This invention relates to electronic data processing, and more particularly, is concerned with apparatus for exchanging information between a high-speed and a low-speed memory.

BACKGROUND OF THE INVENTION

It has been the practice in the past, in order to reduce the amount of high-speed main memory storage required in a data processing system, to provide a system in which the main memory was backed up by disk file or similar type of high-volume low-speed memory. Whenever an array of data or segment program instructions were no longer required by a processor, that portion in the main memory could be cleared by transferring the data or instructions back into the disk file. The space could then be used to store new data brought in from the disk file. In this manner, the amount of high-speed storage accessible by the data processors could be held to a minimum. However, the process of transferring information either from the disk file to the main memory or from the main memory to the disk file can take place only at a speed limited by the speed at which information can be read out of or written into the disk file. Too much of the time of the main memory is therefore used up in transfer of data to and from the disk file. One proposal for speeding up this process is to use an intermediate speed memory as a buffer between the high-speed main memory and the disk file. While such an arrangement reduces the time involved of the main memory in completing the exchange of data with the disk file, excessive time is still involved in requiring separate memory cycles of the high-speed memory in transferring data out of a particular location to the buffer memory and then transferring data into the same location from the buffer memory.

SUMMARY OF THE PRESENT INVENTION

The present invention provides an arrangement in which information can be transferred to or from a disk file, for example, utilizing an intermediate bulk storage with which information is exchanged with the high-speed main memory at the speed of the high-speed memory. The invention operates such that data is swapped between the bulk memory and the main memory during each Read-Write memory cycle of the main memory. Further, the bulk memory is divided into a number of time-shared sections so that the data exchange or swap takes place between the main memory and the several sections of the bulk memory in sequence on a time-shared basis, permitting the main memory to cycle continuously at its high memory cycle rate. Thus in 10 memory cycles of the main memory, for example, the data in 10 memory locations of the main memory can be exchanged for new data in the same 10 memory locations.

This is accomplished, in brief, by providing a high-speed memory having the usual Read-Write memory cycle and a plurality of low-speed memories each having a modified Read-Write memory cycle. The low-speed memories have a delay between the end of the Read and start of the Write portions of their operating cycles, the delay corresponding to the Read-Write cycle time of the high-speed memory. The start of the low-speed cycles of the low-speed memories are staggered at intervals corresponding to said delay, so that the memory cycles of the low-speed memories overlap. Data read out of a low-speed memory during the Read portion of its memory cycle is transferred to the high-speed memory during the Read portion of the high-speed memory cycle. The data read out of the high-speed memory during the same Read portion of its memory cycle is transferred to the same low-speed memory during the Write portion of the same high-speed memory cycle, and is then written into the low-speed memory during the following delayed Write portion of the same low-speed memory cycle. This process is repeated during each high-speed memory cycle with the next low-speed memory in the sequence.

BRIEF DESCRIPTION OF THE DRAWINGS

For a more complete understanding of the invention, reference should be made to the accompanying drawings wherein.

DETAILED DESCRIPTION OF THE INVENTION

Figure 1:
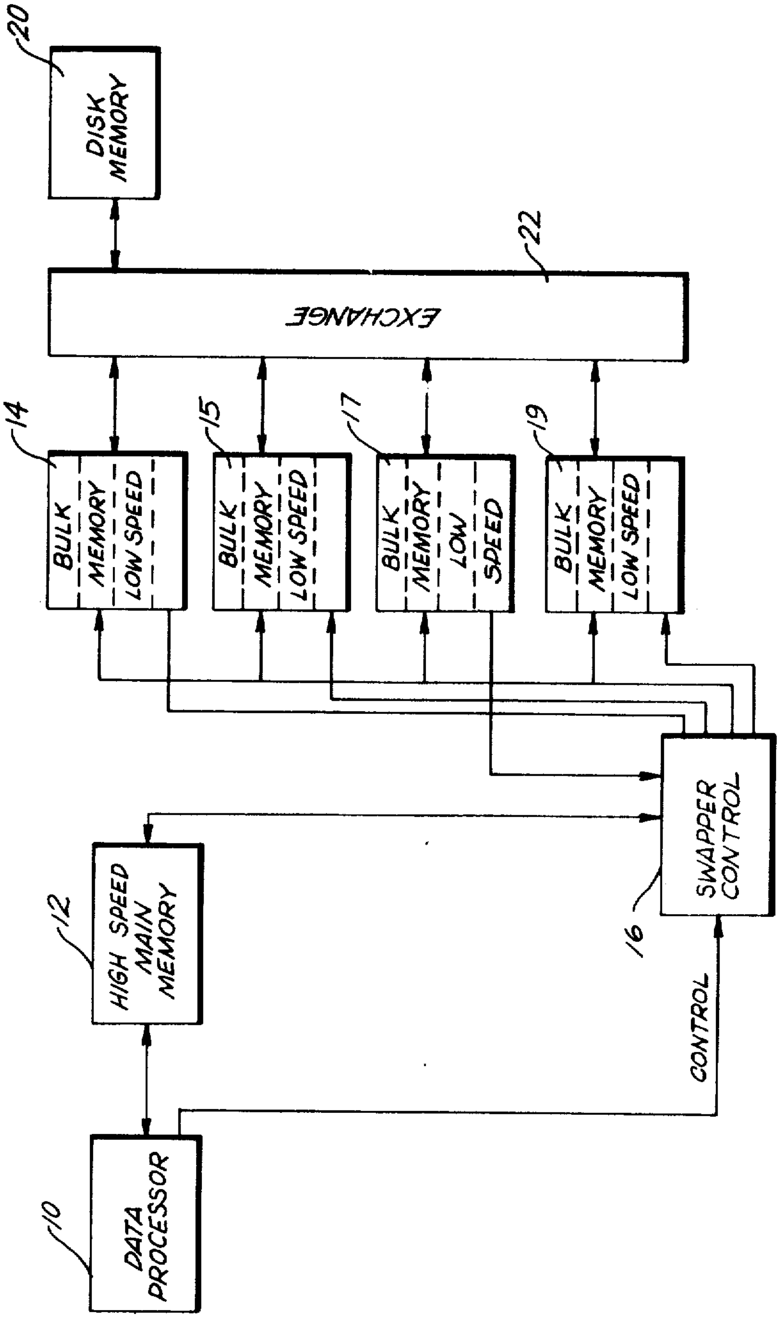
FIG. 1 is a block diagram of a digital computer system incorporating the features of the present invention.

Referring to FIG. 1 in detail, there is shown a digital computer system including at least one data processor 10 which communicates with a high-speed main memory 12. While a single data processor and a single main memory is shown, it will be understood that the main memory may include a number of separate memory modules which communicate through a suitable exchange with any number of data processors, as is conventional in multiprocessing systems. The high-speed memory 12 may be any suitable type of addressable random access memory, such as a thin film memory or core memory. In either writing into or reading from the main memory, an address is inserted in the memory and a memory cycle is initiated which involves first reading out the information in the addressed cell in memory and then either writing the same information back in to restore the information or writing in new information into the same cell. Thus the same basic memory cycle is used for either a Read operation or a Write operation.

According to the present invention, data is exchanged between the high-speed main memory 12 and a low-speed bulk memory 14 through a swapper control circuit 16. The low-speed bulk memory 14, which is preferably a magnetic core random access type memory, is arranged to transfer information with a disk memory 20 in conventional manner. By using the swapper control 16 as an effective interface between the main memory 12 and the bulk memory 14, a number of additional bulk memories 15, 17, and 19 may be provided to permit unlimited memory extension. The several low-speed bulk memories communicate with the disk memory 20 through a suitable exchange 22.

Figure 2:
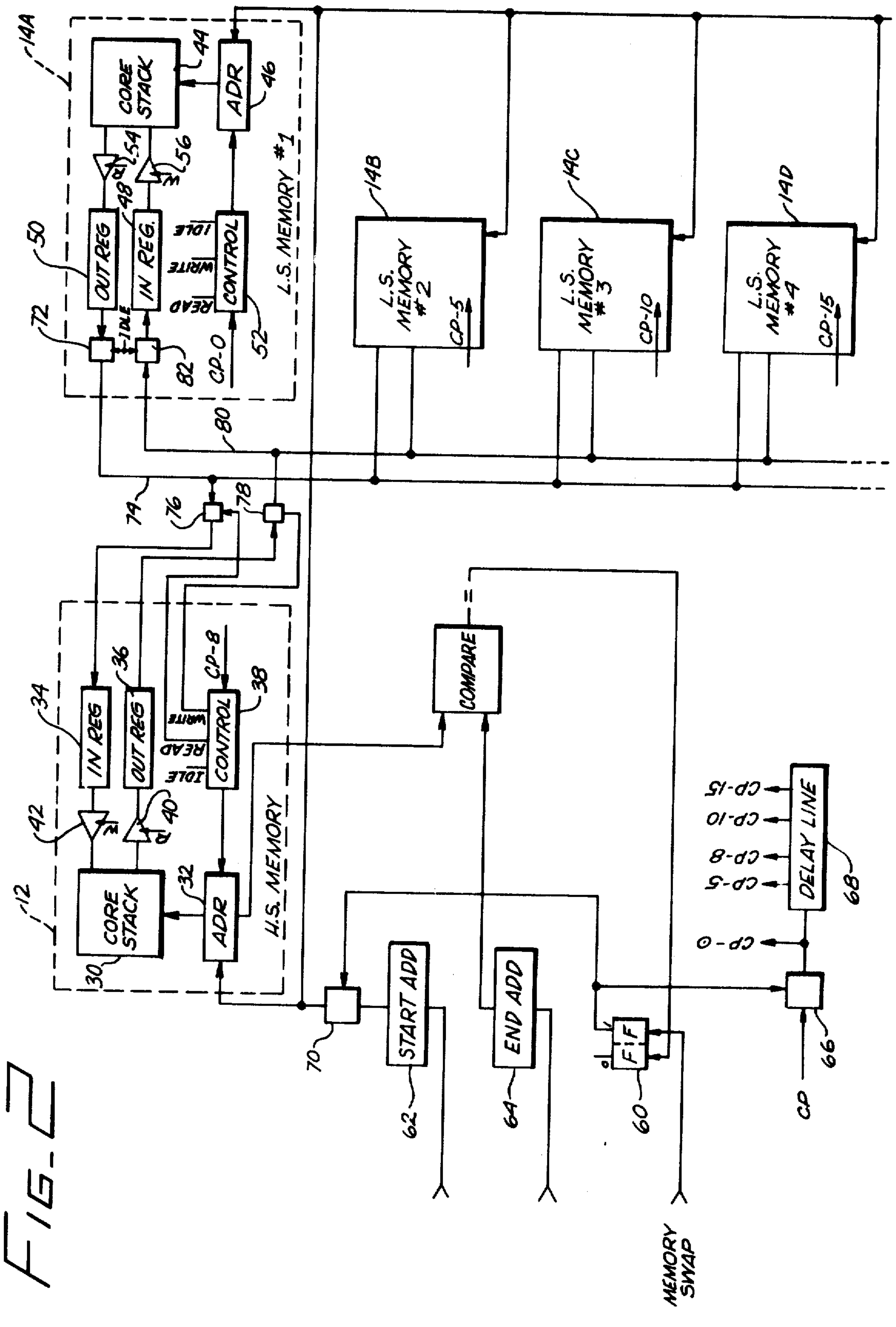
FIG. 2 is a schematic block diagram of one embodiment of the present invention.

The manner in which the swapper control 16 functions to swap information between the main memory 12 and the low-speed bulk memory 14 is shown in detail in FIG. 2. The high-speed memory 12 includes a core or thin film memory stack 30. Memory cells in the stack 30 are addressed by the contents of an address register 32. Information to be read into the stack is stored in an input information register indicated at 34. Information read out of the stack goes to an output information register indicated at 36. The memory cycle is controlled by a sequence control circuit 38 which operates in response to the application of clock pulses. The normal memory cycle is involves first performing a Read operation in which sense amplifiers 40 are activated and the addressed cores are strobed. This causes the readout on the sense windings to be amplified by the amplifiers 40 to set the corresponding bits in the output information register 36. This is followed by a Write operation in which the addressed cores are again strobed. At the same time drive amplifiers 42 are activated to set the particular cores in the stack according to the bits stored in the input information register 34. Random access memories of this type are well known in the art, although the conventional memory differs in that usually a single information register is used for both the Read and Write operation.

The low-speed bulk memory 14 is arranged in a number of sections, four of which are indicated by way of example at 14A, 14B, 14C, and 14D. The number of bulk memory sections is determined by the relative speed of the low-speed memory to the high-speed memory. For example, if the high-speed memory is a 1 microsecond memory and the low-speed memory sections are each 4 microsecond memories, four low-speed memory sections are required to operate the high-speed memory at its maximum speed.

Each low-speed memory section includes a core stack 44 and an address register 46. Input information is stored in an input information register 48 and output information is stored in an output information register 50. A sequence control circuit 52 cycles the low-speed memory through its memory cycle in response to applied clock pulses. During the Read portion of the memory cycle, the sense amplifiers 54 are activated and during the Write portion of the memory cycle, the drive amplifiers 56 are activated.

The swapper control circuit 16 includes a control flip-flop 60 which is turned on in response to a memory swap control signal from the data processor 10. The data processor also loads a starting address in a Start Address register 62 and a finishing address in an End Address register 64. When the flip-flop 60 is turned on, it gates clock pulses CP from the system clock through a gate 66. The clock pulses are applied to a delay line 68 which provides a series of delayed clocks. These clocks are designated CP–0, having no delay; CP–5, having a delay of 5 clock pulse intervals; CP–8, having a delay of 8 clock intervals; CP–10, having a delay of 10 clock pulse intervals; and CP–15, having a delay of 15 clock pulse intervals. While a delay line 68 is shown by way of an example, it will be understood that a binary counter circuit may be used to generate the various time delays.

The control flip-flop 60 also gates the contents of the Start Address register 62 to the address register 32 of the high-speed memory and to the address register 46 of each of the low-speed bulk memory sections through a gate 70. The CP–0 clock pulses are applied to the sequence control 52 of the low-speed bulk memory section 14A, while the CP–5, CP–10, and CP–15 clock pulses are applied respectively to the other three sections 14B, 14C, and 14D of the low-speed bulk memory circuit.

Figure 3:
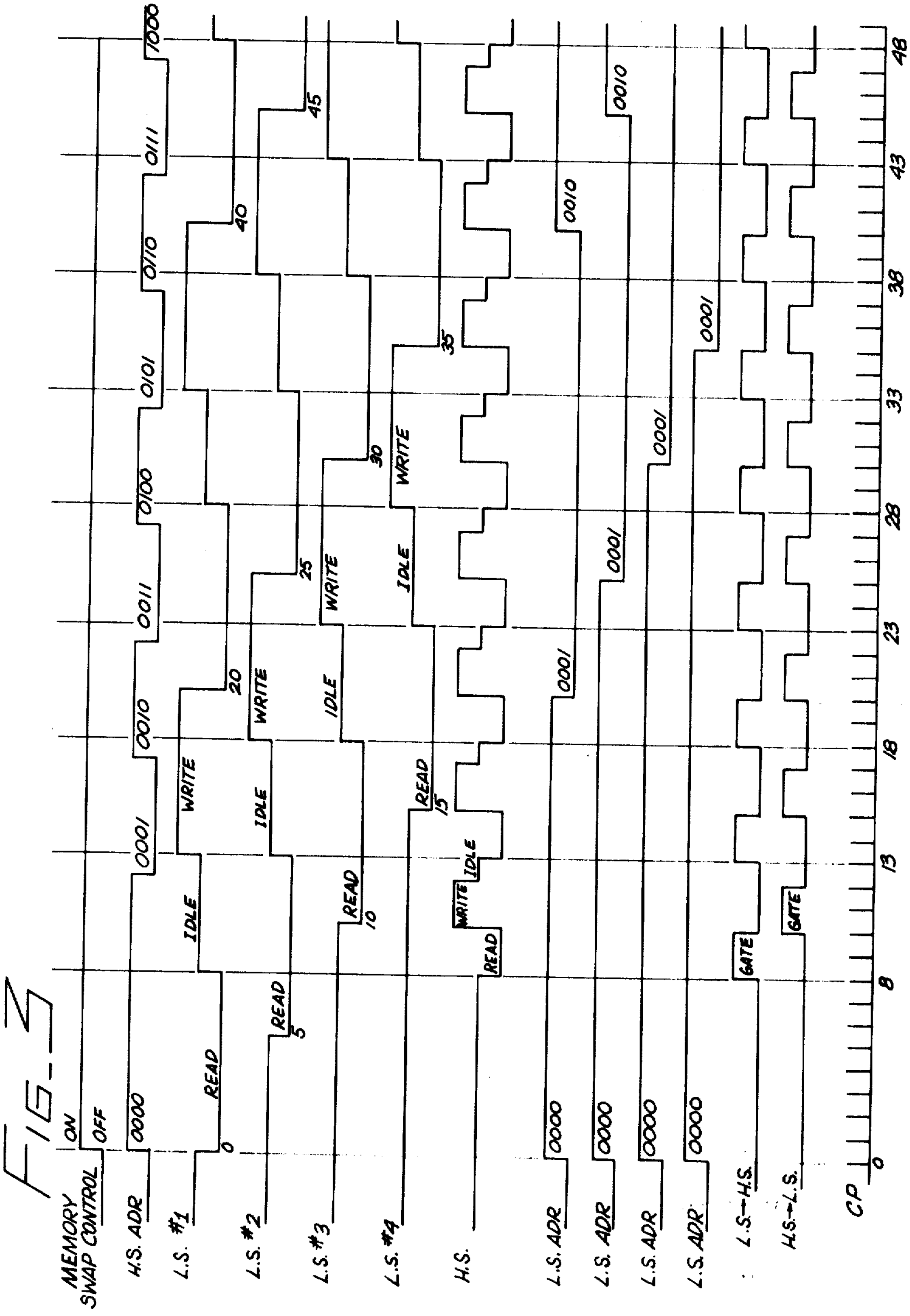
FIG. 3 is a series of timing diagrams useful in explaining the operation of the invention.

The application of clock pulses to the sequence control circuit 38 of the high-speed memory and to the sequence control circuit 52 of each of the low-speed memories causes the respective memory modules to sequence through their controlled memory cycles. Each of the low-speed memories has a cycle which includes a Read portion followed by an Idle period and ending with a Write portion. As shown in FIG. 3, with the application of the CP–0 clock pulses to the first section of the low-speed memory, a Read operation is initiated which lasts for 8 clock periods followed by an Idle period of 5 clock pulse intervals and ending with a Write operation lasting for 7 clock periods. Thus one complete memory cycle takes 20 clock pulse intervals. The same cycle is initiated in each of the other sections of the low-speed memory at delayed intervals of 5 clock pulse intervals, i.e., at delayed intervals corresponding to one-fourth of the total memory cycle time. At the end of the Read portion of the memory cycle of low-speed memory, a memory cycle of the high-speed memory is initiated by the CP–8 pulses applied to the sequence control 38. The memory cycle of the high-speed memory involves a Read operation followed by a Write operation and an Idle period extending respectively for 2 clock periods, 2 clock periods and 1 clock period. Thus the high-speed memory cycle takes a total of 5 clock intervals for completion i.e., one-fourth of the memory cycle time of the low-speed memories.

As further noted in FIG. 3, the delay of 8 clock pulse intervals between the initiating of the first memory cycle of the first low-speed bulk memory section and the start of the first memory cycle of the high-speed main memory results in the high-speed memory cycle always taking place during the Idle interval of the low-speed memory cycle of one of the sections of low-speed memory. Each subsequent memory cycle of the high-speed memory corresponds to the Idle interval of the memory cycle of successive ones of the low-speed bulk memory sections. Thus for each low-speed memory section there is a Read operation of the low-speed memory followed by Read and Write operations of the high-speed memory followed by a Write operation of the low-speed memory.

The Read operation of each low-speed memory section causes the contents of the addressed location in the stack to be loaded into the output information register 50. During the following Idle portion of the memory cycle, the contents of the output information register 50 are gated by means of a gate 72 to an output bus 74. The bus 74 is connected to the output of similar gates in each of the other low-speed memory sections 14B, 14C, and 14D. The output bus 74 is coupled through a gate 76 to the input information register 34 of the high-speed memory 12. The gate 76 is turned on during the Read portion of the memory cycle by the sequence control 38 of the high-speed memory. Thus at the end of the Read portion of the memory cycle of the high-speed memory, the register 34 has been loaded with a word of data from the particular section of the low-speed memory which is in the Idle portion of its memory cycle. The following Write portion of the memory cycle of the high-speed memory 12 causes the word now read into the output information register 36 to be coupled by means of a gate 78 to an input bus 80 going to each of the low-speed memory sections. The bus 80 is coupled through a gate 82 during the Idle portion of the memory cycle of the particular low-speed memory section to the input information register 48. It is then written into the stack of the low-speed memory section during the following Write portion of the low-speed memory cycle. Thus, it will be seen that there is a swap or exchange of data between the low-speed memory section and the high-speed memory during the Idle portion of the low-speed memory cycle.

At the completion of each memory cycle of the high-speed memory, the address register 32 is counted up by the sequence control circuit 38 so that successive memory cycles of the high-speed memory involves sequential address locations in the stack. Similarly, the address registers 46 in each of the low-speed memory sections are counted up one at the completion of each memory cycle of the associated low-speed memory section.

The timing diagram of FIG. 3 illustrates the operating sequence of the memory swapping operation. It will be seen that the high-speed memory recycles at its maximum rate and that there is an exchange of data during each high-speed memory cycle. By using a plurality of low-speed memory sections with staggered overlapping memory cycles, maximum efficiency of the high-speed memory is achieved.

What is claimed is:

1. Apparatus for exchanging data between two storage devices comprising a high-speed addressable memory, including an input register, an output register, an address register, and control means for causing the memory to sequentially read out the information from the location specified by the address register into the output register and write information into the same location from the input register during one memory cycle, a low-speed addressable memory including an input register, an output register, an address register, and control means for causing the memory to sequentially read out information from the location specified by the address register into the output register and write information into the same location from the input register during one memory cycle, first means for transferring information from the output register of the low-speed memory to the input register of the high-speed memory, second means for transferring information from the output register of the high-speed memory to the input register of the low-speed memory, control means activating said first transferring means during the read portion of a high-speed memory cycle and activating the second transferring means during the write portion of the same high-speed memory cycle, and means synchronizing the high speed memory cycle with the low-speed memory cycle such that the high-speed memory cycle occurs between the completion of the read portion and start the Write portion of the low-speed memory cycle.

2. Apparatus as defined in claim 1 further comprising additional lowpspeed memories, switching means for switching said first and second transferring means to the input and output registers of each of the low-speed memories in sequence, and means for synchronizing the switching means with the start of each high-speed memory cycle.

3. Apparatus as defined in claim 2 including means initiating memory cycles in the low-speed memories in sequence at spaced intervals corresponding to the time duration of a high-speed memory cycle.

4. Apparatus as defined in claim 3 including means changing the address in each address register with each memory cycle of the associated memory.

5. Apparatus as defined in claim 3 wherein the number of low-speed memories is equal to the ratio of the low-speed memory cycle time to the high-speed memory cycle time.

6. Apparatus as defined in claim 2 wherein the control means of each of the low-speed memories provides a delay interval between the end of the read and start of the write portions of the memory cycle, said delay interval being substantially equal to the memory cycle time of the high-speed memory.

7. Apparatus for exchanging information in a digital storage register comprising an addressable high-speed memory having a read-write memory cycle, a plurality of low-speed memories each having a read-write memory cycle, the memory cycle of the low-speed memories having an idle period between the read and write portions of the cycle, first control means for continuously recycling the high-speed memory including means for addressing a different location in memory with each memory cycle, second control means for continuously recycling each of the low-speed memories including means for addressing a different location in each memory with each memory cycle of that memory, said second control means including delay means for starting the low-speed memory cycles sequentially at intervals corresponding to the time of one memory cycle of the high-speed memory, first means transferring a word from a low-speed memory to the high-speed memory during the read portion of a high-speed memory cycle, and a second means transferring a word from the high-speed memory to the same low-speed memory curing the write portion of same high-speed memory cycle.

8. Apparatus as defined in claim 7 further including means connecting the first and second transferring means to each low-speed memory in sequence during the idle period of the memory cycle of each low-speed memory.

9. Information swapping apparatus for exchanging digital words between two addressable random access memory units during one memory cycle of both units where the memory cycle of each unit includes a read portion for reading out the word stored in a particular address location followed by a write portion for writing in a word into the same address location, said apparatus comprising first and second registers, means reading a word from a predetermined address in the first memory unit into the first register in response to the read portion of a memory cycle of the first memory unit, means reading a word from a predetermined address in the second memory unit into the second register in response to the read portion of a memory cycle of the second memory unit, means writing the word in the first register into the same address location in the second memory unit in response to the write portion of the same memory cycle of the second memory unit, means writing the word in the second register into the same address location in the first memory unit in response to the write portion of the same memory cycle of the first memory unit, and means synchronizing the memory cycles of the two memory units such that the transition from the read to the write portions of the memory cycles of both memory units are coincident.

10. Apparatus as defined in claim 9 wherein the memory cycle of the first memory unit has a period substantially longer in time duration than the memory cycle of the second memory unit.

11. Apparatus as defined in claim 10 wherein the first memory unit has delay time between the end of the Read portion of the memory cycle and the start of the Write portion that is substantially equal to the period of one memory cycle of the second memory unit.